(12) United States Patent
Halperin et al.

(10) Patent No.: US 12,120,371 B2
(45) Date of Patent: Oct. 15, 2024

(54) VIDEO STREAMING AUTHORIZATION

(71) Applicant: Playback Inc., San Ramon, CA (US)

(72) Inventors: Robert Joshua Halperin, San Francisco, CA (US); Ariel Samuel Borensztein, Philadelphia, PA (US); Thomas Anthony Berger, Brooklyn, NY (US)

(73) Assignee: PLAYBACK INC., San Ramon, CA (US)

( * ) Notice: Subject to any disclaimer, the term of this patent is extended or adjusted under 35 U.S.C. 154(b) by 0 days.

(21) Appl. No.: 17/937,643

(22) Filed: Oct. 3, 2022

(65) Prior Publication Data

US 2024/0114189 A1    Apr. 4, 2024

(51) Int. Cl.
| | |
|---|---|
| *H04N 21/258* | (2011.01) |
| *H04N 21/2187* | (2011.01) |
| *H04N 21/41* | (2011.01) |

(52) U.S. Cl.
CPC ... *H04N 21/25875* (2013.01); *H04N 21/2187* (2013.01); *H04N 21/4104* (2013.01)

(58) Field of Classification Search
CPC ......... H04N 21/25875; H04N 21/2187; H04N 21/4104
See application file for complete search history.

(56) References Cited

U.S. PATENT DOCUMENTS

| | | | |
|---|---|---|---|
| 10,498,794 B1 * | 12/2019 | Keighran | H04L 65/612 |
| 11,134,309 B2 | 9/2021 | Loheide et al. | |
| 2007/0269181 A1 | 11/2007 | Kikuchi | |
| 2011/0321079 A1 * | 12/2011 | Lankford | H04L 65/1069 |
| | | | 726/5 |
| 2014/0082645 A1 | 3/2014 | Stern et al. | |
| 2014/0133836 A1 * | 5/2014 | Burns | G11B 27/036 |
| | | | 386/278 |
| 2014/0267571 A1 * | 9/2014 | Periyannan | H04L 12/1827 |
| | | | 348/14.08 |
| 2016/0080817 A1 * | 3/2016 | Chai | G06F 3/04842 |
| | | | 725/43 |
| 2017/0251246 A1 * | 8/2017 | Hua | H04N 21/84 |
| 2018/0035136 A1 | 2/2018 | Crowe | |
| 2018/0352305 A1 | 12/2018 | Bowen et al. | |
| 2019/0089996 A1 | 3/2019 | Surcouf et al. | |
| 2022/0083310 A1 | 3/2022 | Lynch | |
| 2024/0121465 A1 | 4/2024 | Halperin et al. | |

\* cited by examiner

*Primary Examiner* — Sumaiya A Chowdhury
(74) *Attorney, Agent, or Firm* — SCHWEGMAN LUNDBERG & WOESSNER, P.A.

(57) ABSTRACT

A method includes for a plurality of devices, each of the plurality of devices having access to a first video stream from at least one of a plurality of streamers of the first video stream, confirming authorization to access the first video stream from one of the plurality of streamers of the first video stream, selecting a first streamer from the plurality of the streamers, receiving the first video stream from the first streamer, transmitting the first video stream to the plurality of devices having confirmed authorization.

17 Claims, 7 Drawing Sheets

VIDEO STREAMING AUTHORIZATION

TECHNICAL FIELD

This disclosure related to video streaming and more particularly, but not exclusively, to authorization access to a video stream for multiple viewing devices.

BACKGROUND

Streaming is the continuous transmission of video files from a server to a client device, such as a mobile phone, tablet, laptop, etc. With streaming, the video file being played on the client is stored at the server and is transmitted in segments over the Internet for real time playback and is generally not saved in its entirety on the client.

BRIEF SUMMARY

In one aspect, a method, includes for a plurality of devices, each of the plurality of devices having access to a first video stream from at least one of a plurality of streamers of the first video stream, confirming authorization to access the first video stream from one of the plurality of streamers of the first video stream, selecting a first streamer from the plurality of the streamers, receiving the first video stream from the first streamer, transmitting the first video stream to the plurality of devices having confirmed authorization.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

Terms such as "processing," "computing," "calculating," "determining," "displaying," "generating" or the like, unless specifically stated otherwise, may refer to actions and processes of a computing device that manipulates and transforms data represented as physical (electronic) quantities within the computer's memory or registers into other data similarly represented as physical quantities within the computer's memory, registers, or other such storage medium, transmission, or display devices.

The terms "connected," "coupled," or variants thereof, as used herein, may refer to any connection or coupling, either direct or indirect, between two or more elements. The coupling or connection between the elements can be physical, logical, or a combination thereof.

Figure 1:
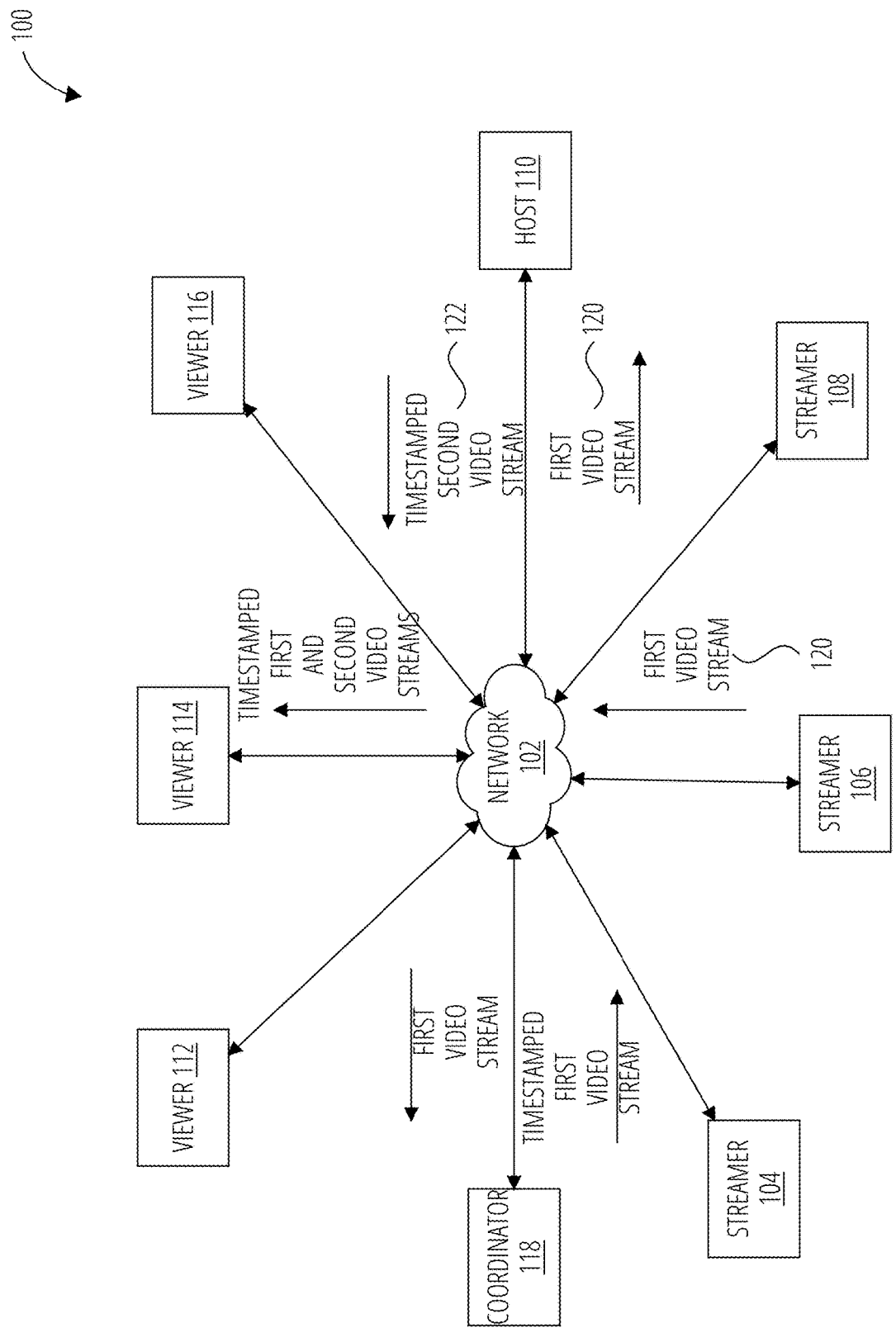
FIG. 1 is a diagrammatic representation of a networked environment in which the present disclosure may be deployed, in accordance with some examples.

FIG. 1 is a diagrammatic representation of a network environment 100 in which some examples of the present disclosure may be implemented or deployed. The network environment 100 includes a plurality of video streamers, e.g., streamer 104, streamer 106, and streamer 108; a plurality of viewers, e.g., viewer 112, viewer 114, and viewer 116; a coordinator 118 and a host 110; all interconnected via a network 102, such as the Internet, a Local Area Network (LAN), a Wide Area Network (WAN), etc.

During operation of the network environment 100, the viewers have authorization (e.g., via credentials such as username and password and/or location of the viewer) to access the streamers. For example, the viewer 112 may have authorization to access a first video stream 120 from the streamer 104 while the viewer 114 may have authorization to access the same first video stream 120 from the streamer 106. The viewer 116 may have authorization to access the same first video stream 120 from both the streamer 106 and the streamer 108.

If the host 110 wishes to host a "room" then the coordinator 118 for the first video stream 120 will check the authorization of all of the viewers of the plurality of viewers that want to join or have joined the room. The coordinator 118 will select a streamer (e.g., one deemed most reliable), before or after the authorization process, from the plurality of streamers to stream and request the selected streamer to transmit the first video stream 120 to it, e.g., via a remote browser running in a cloud. In addition, the host 110 will generate a second video stream 122 and transmit it to the coordinator 118 or directly to all authorized viewers. The coordinator 118 then transmits the first video stream 120 and optionally the second video stream 122 (if the host 110 did not transmit the second video stream 122 to the viewers) to the viewers with authorization to access the first video stream 120.

Accordingly, for example, if the viewer 112 had authorization to access the first video stream 120 from the streamer 104 but the coordinator 118 determined that the first video stream 120 from the streamer 106 is more reliable (e.g., low latency) and/or otherwise preferred (e.g., higher resolution), the coordinator 118 would retransmit the first video stream 120 from the streamer 106 to the viewer 112.

At each authorized viewer of the plurality of viewers, a syncher 310 (FIG. 3) will synchronize the first video stream 120 and the second video stream 122 to display synchronously on a display of each viewer based on time stamps in the first video stream 120 and the second video stream 122.

In addition, each of the plurality of viewers may generate additional video streams that the coordinator 118 would receive and transmit to all of the viewers in a room or could be transmitted to other viewers bypassing the coordinator 118. The syncher 310 at each viewer would then synchronize display of the additional video streams with the first video stream 120 and the second video stream 122 based on time stamps in each of the video streams.

In addition, each of the plurality of viewers and the host 110 can generate text (see FIG. 5) that can be displayed on each of the viewers and the host 110. Note that the text does not need to be time stamped but can be for synchronous display with the video streams.

Further, while three viewers, three streamers and one host 110 are shown, any number of viewers, streamers and hosts are able to simultaneously use the coordinator 118 to generate a room as described above using the same first video stream 120 or a different video stream from one of the streamers.

Further, the first video stream 120 and the second video stream 122 can include video and/or audio.

In one example, the timestamps of the second video stream 122 (e.g. the host 110 camera stream) are also being inserted based on "wall clock time" as is the first video stream 120. To clarify, when the host 110 receives the first video stream 120 (e.g., NFL stream), they are not performing any process to align the second video stream 122 with the first video stream 120 timestamps. No manual synchronization process is needed (e.g., waterfalling the streams to ensure matching time stamps).

From a high level overview of the network environment 100, the origin and delivery of the two streams that make up a room experience can be as follows in one example:

1. The content stream (e.g. NFL stream) originates from a video loaded in a remote web browser running in the cloud. The coordinator 118 can load any web page, capture the video element loaded on the web page, and stream that first video stream 120 content over WebRTC to both the host 110 and viewers who are joined in rooms.
2. The host 110 stream (e.g. host's camera/mic streams) originates from the host 110. A third party service (e.g., Daily) is used to send the host 110 second video stream 122 to all viewers in a room over WebRTC.

Note: in this example, there is no waterfall processing of the streams before sending them to host/viewers in a room (i.e., a host 110 is not receiving the content stream before sending their stream to viewers); both the first video stream 120 and host second video stream 122 get directly delivered to host/viewers concurrently in real-time. Host and viewers will be seeing the same streams within 50-200 ms of one another.

Figure 2:
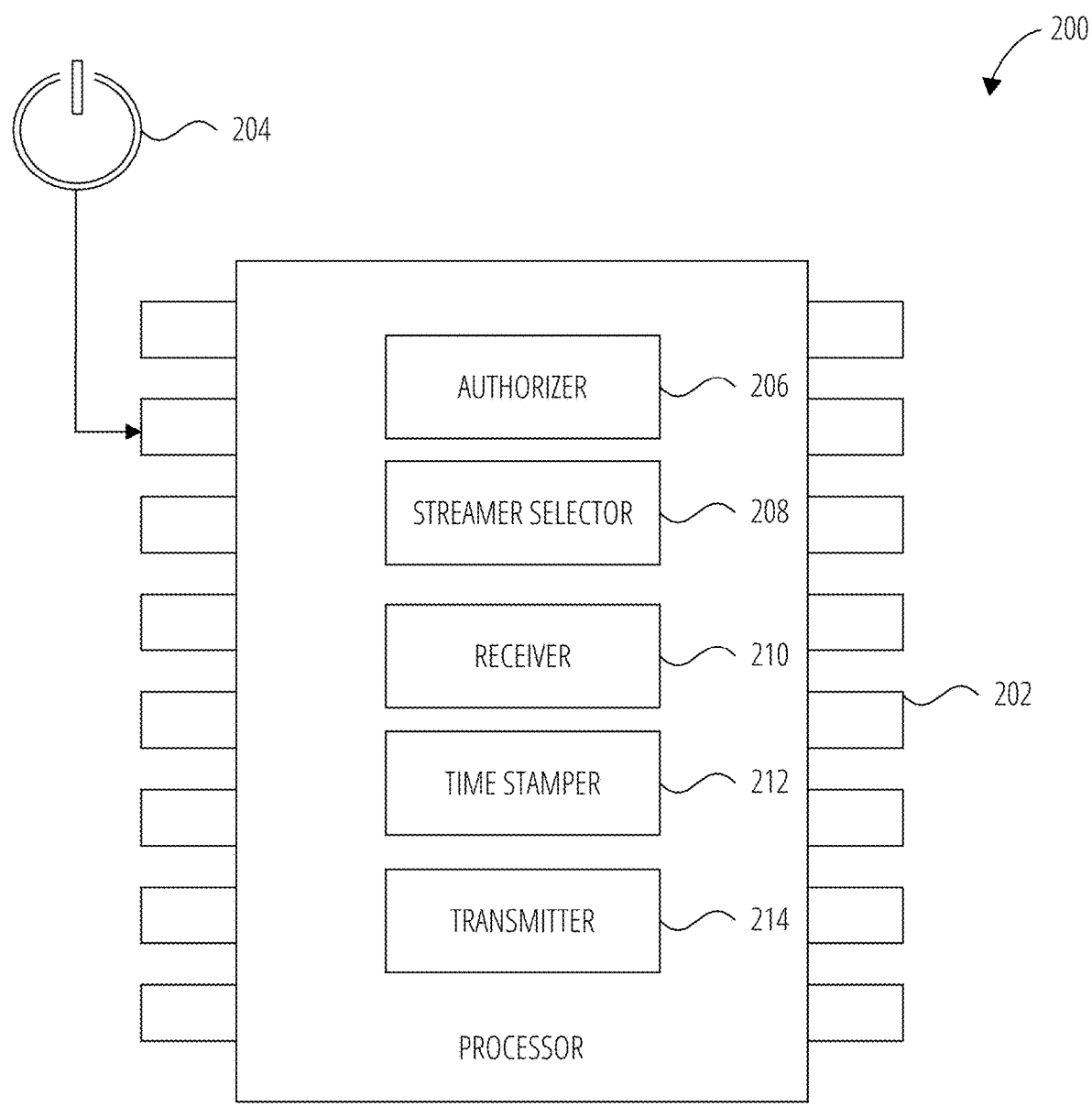
FIG. 2 a diagrammatic representation of a processing environment of a coordinator, in accordance with some examples.

Turning now to FIG. 2, a diagrammatic representation of a processing environment 200 of the coordinator 118 is shown, which includes a processor 202 (e.g., a GPU, CPU, or combination thereof).

The processor 202 is shown to be coupled to a power source 204 and to include (either permanently configured or temporarily instantiated) modules, namely an authorizer 206, a streamer selector 208, a receiver 210, a time stamper 212 and a transmitter 214.

During operation of the coordinator 118, the authorizer 206 checks the plurality of viewers' authorization to view the first video stream 120 from one or more of the streamers. New viewers will need to provide authorization information (e.g., username and password) while prior viewers will have authorization information previously saved. Authorization can also include checking if a viewer is authorized to view the first video stream 120 based on a location of the viewer (e.g., using IP address of the viewer, location of the viewer as indicated by GPS, mobile phone network connected to, and/or other techniques). For example, if the viewer 112 has authorization to view the first video stream 120 based on its credentials, the viewer 112 may still not have full authorization by being outside of an authorized location.

The streamer selector 208, based on stream source mapping of the streamers, selects one of the plurality of streamers to stream the first video stream 120 to the viewers that have authorization per the authorizer 206. The stream source mapping may include video streams of movies, sports events, music concerts, and/or other events (live or prerecorded) and media, all streamers for each of the respective video streams, and time of the streaming (e.g., sporting event start time or movie premiere). The mapping may be based on most reliable streamer historically (e.g., historically low latency) and/or based on real time measurements of the first video stream 120 (e.g., current latency).

Once a streamer is selected by the streamer selector 208, the receiver 210, which can be implemented with WebRTC for example, will receive the first video stream 120 from the selected streamer (e.g., using a remote browser in a cloud to identify video in a webpage and stream the identified video). The time stamper 212 then time stamps segments of the first video stream 120 (e.g., 90 kHz for the video and 48 kHz for the audio) with a current time. The transmitter 214 may then send the timestamped first video stream 120 to the host 110 for the host 110 to produce the second video stream 122. The receiver 210 may then optionally receive the second video stream 122 from the host 110 (or the host 110 may transmit the second video stream 122 to the viewers bypassing the receiver 210).

The time used for timestamping can be based on a time maintained at the coordinator 118 or from a remote source (e.g., from the National Institute of Standards and Technology). The second video stream 122 may already be time stamped by the host 110 or can be time stamped similarly by the time stamper 212. The transmitter 214 then transmits both the timestamped first video stream 120 and, optionally, the timestamped second video stream 122 (if not transmitted by the host 110 to the viewers), to authorized viewers.

Figure 3:
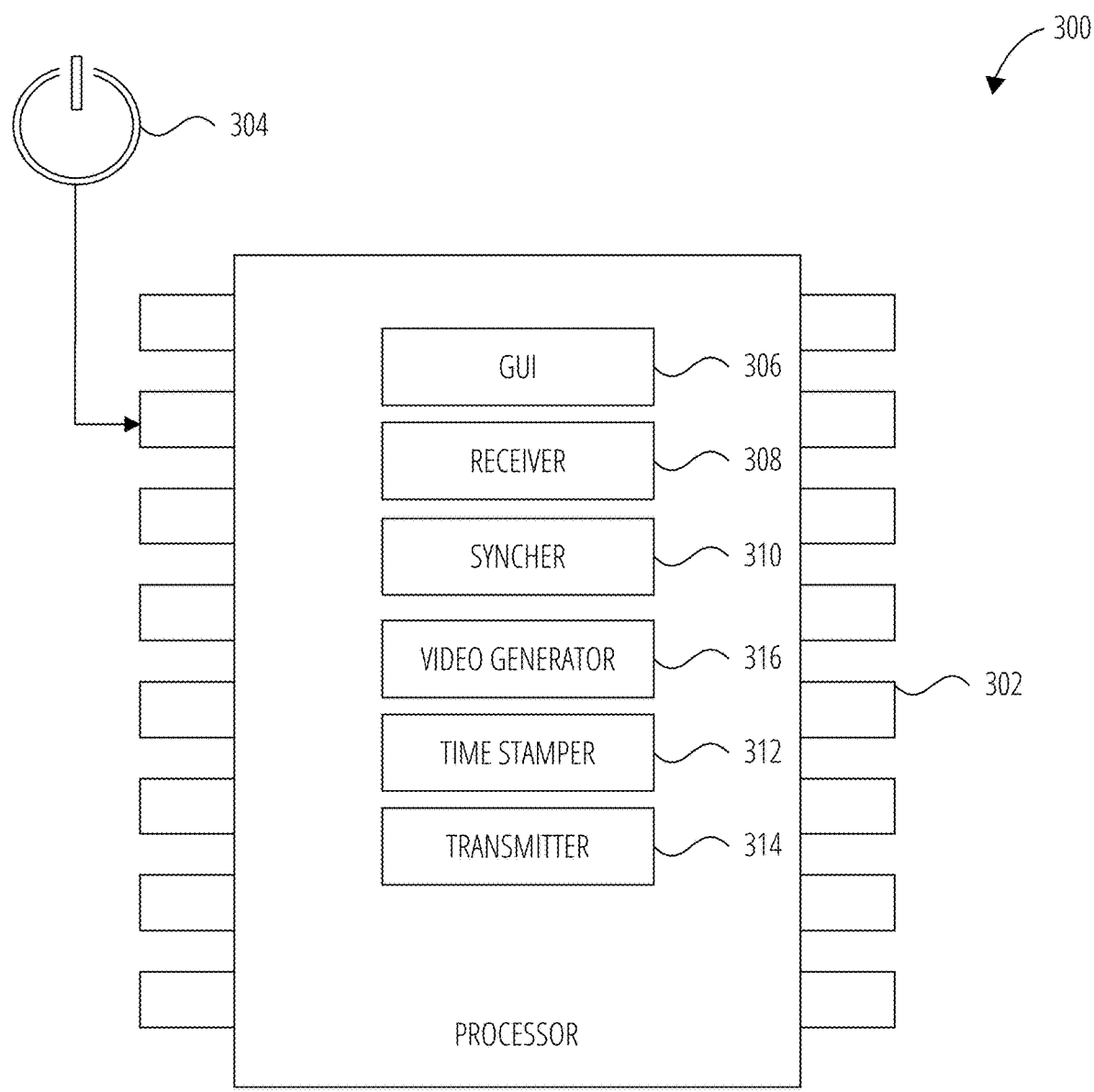
FIG. 3 is a diagrammatic representation of a processing environment of a viewer, in accordance with some examples.

Turning now to FIG. 3, a diagrammatic representation of a processing environment 300 of a viewer, such as the viewer 112, is shown, which includes a processor 302 (e.g., a GPU, CPU, or combination thereof). The host 110 can have a similar processing environment to the processing environment 300.

The processor 302 is shown to be coupled to a power source 304, and to include (either permanently configured or temporarily instantiated) modules, namely a graphical user interface GUI 306, a receiver 308, a syncher 310, a time stamper 312 and a transmitter 314.

During operation of the processing environment 300 the GUI 306 will display both the first video stream 120 and the second video stream 122 as received by the receiver 308 from the coordinator 118 and/or the host 110, respectively. The syncher 310 ensures that the GUI 306 displays the two video streams in synch based on time stamps in the video streams. The video generator 316 optionally generates the second video stream 122 if the processing environment 300 is being implemented on the host 110 or an additional video stream if the processing environment 300 is implemented in one of the viewers. For any video generated locally, the time stamper 312 regularly time stamps the generated video to have synchronous time stamps with the first video stream 120 based on a time (e.g., locally or remotely kept time) or by matching up time stamps in the second video stream 122 based on time stamps in the first video stream 120 (e.g., waterfalling the video streams). This ensures the first video stream 120 and the second video stream 122 are in synch when displayed on the GUI 306. Any video generated is then transmitted by the transmitter 314 to the coordinator 118 for transmitting to the plurality of viewers. Alternatively, the generated video can be transmitted to the host 110 and/or viewers bypassing the coordinator 118.

Figure 4:
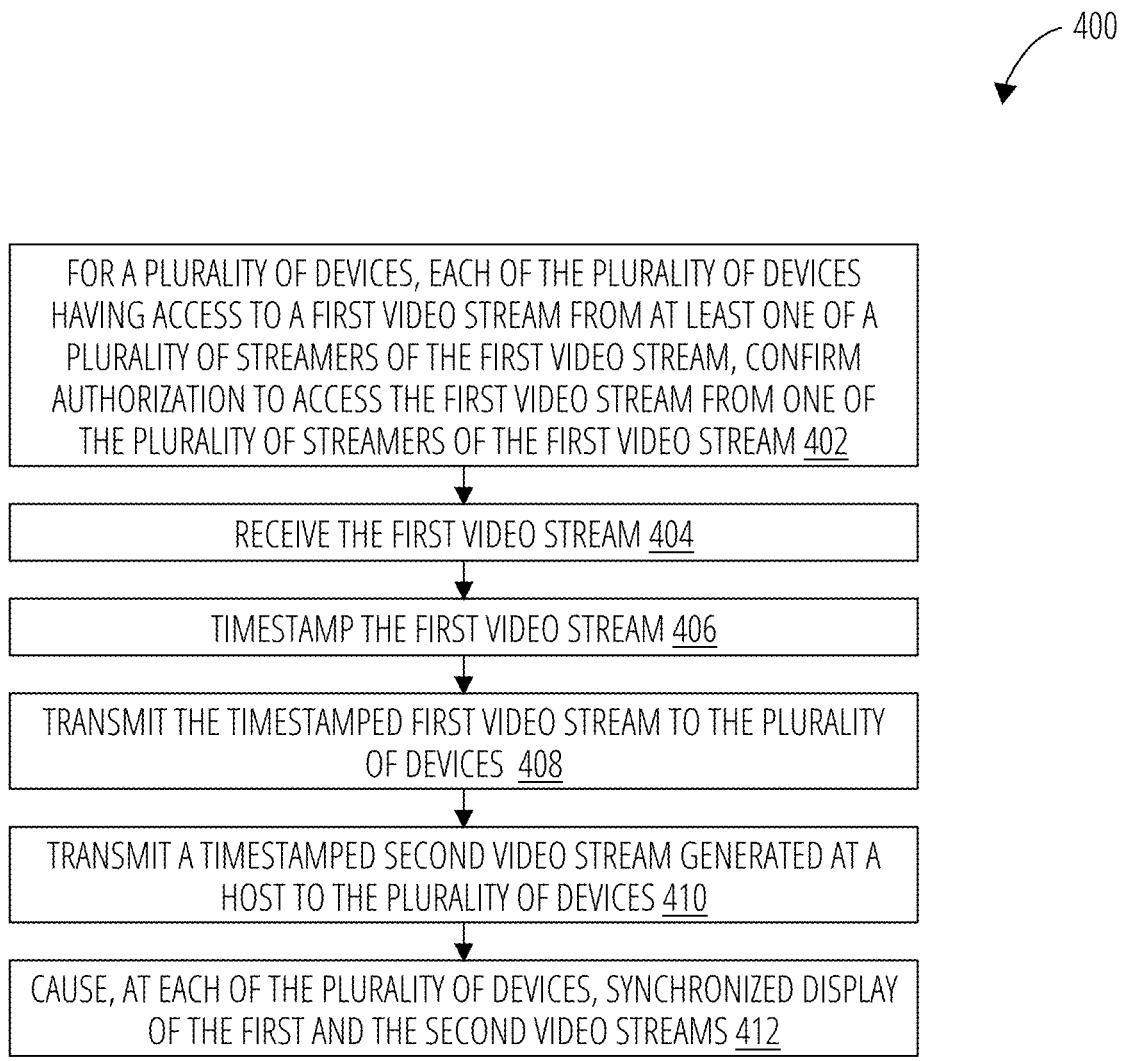
FIG. 4 is a flowchart of a method of streaming video, in accordance with some examples.

FIG. 4 is a flowchart of a method of streaming video, in accordance with some examples. In block 402, for a plurality of devices (e.g., the viewer 112, viewer 114, etc.), each of the plurality of devices having access to a first video stream (e.g., the first video stream 120) from at least one of a plurality of streamers of the first video (e.g., streamer 104, streamer 106, etc.), confirm authorization to access the first video stream from one of the plurality of streamers of the first video. In block 404, the coordinator 118 receives the first video stream. In block 406, the coordinator 118 timestamps the first video stream. In block 408, the coordinator 118 transmits the timestamped first video stream to the plurality of devices. In block 410, the host 110 or the coordinator 118 transmits a timestamped second video stream (e.g., the second video stream 122) generated at the host 110 to the plurality of devices. In block 412, cause, at each of the plurality of devices, synchronized display of the first and the second video streams.

Note if the host 110 selects a new video stream in an existing room, the method 400 can be repeated from the confirming authorization 402 and removing unauthorized viewers from the room.

Note that order of operations may be different than that described and some operations or parts of operations are optional. Further, some operations can be performed concurrently instead of sequentially.

Figure 5:
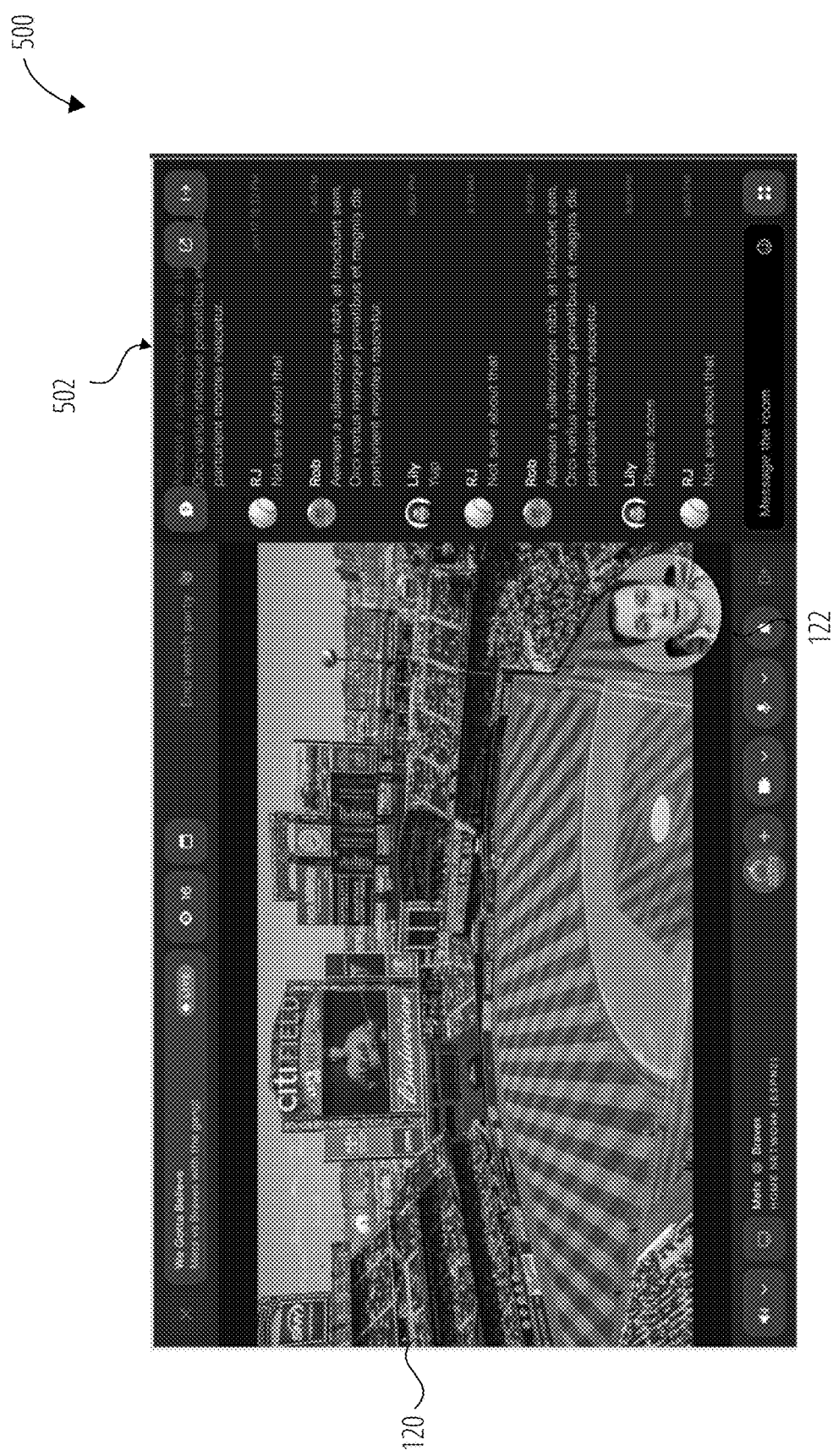
FIG. 5 illustrates an graphical user interface, in accordance with some examples.

FIG. 5 illustrates the GUI 306, in accordance with some examples. The GUI 306 comprises 3 panels including a panel for displaying the first video stream 120, a second panel for displaying the second video stream 122 and optionally a third panel for displaying a text stream 502 from the plurality of viewers. The second video stream 122 may partially or fully overlay the first video stream 120.

An example authentication and streaming process may include the following:

Step 1: use event and broadcast network data to spin up the receiver 210 (FIG. 2) (e.g., to spin up a remote browser) to capture the stream.
  The coordinator 118 combines event and broadcast data from a data provider, such as Sportsradar, with a stream source mapping based on the best and most reliable sources for each league/network/game (e.g., low latency, low dropped packets, etc.).
  For example, a room wants to watch the New York Mets vs. the Pittsburgh Pirates on a streamer such as SNY
    15 minutes before first pitch (6:35 PM ET), a remote browser window would automatically go to the link on MLB TV's site for the SNY feed for Mets vs. Pirates. The coordinator 118 using the receiver 210 would then capture the stream to be available for the Playback room.
Step 2: the stream is added to the room→new users are asked to complete the TV or streaming service authentication process and existing users have their existing tv or streaming services checked to confirm authorization by the authorizer 206 (FIG. 2).
  For each captured stream, the coordinator 118 append the relevant service authentication rules—basically what network is the game on and what TV service or streaming services could provide access to the game, depending on the user's location
    For the Mets vs. Pirates example, viewers using the coordinator 118 from a specific set of zip codes (made available publicly by MLB TV on their side), would need to access through a cable TV (or equivalent) service. Outside of those zip codes, a user would need a subscription to MLB TV to watch the game.
  Once the stream is added a room, the authentication business logic kicks in:
    For all existing viewers, the coordinator 118 performs a quick check to see if they can access the game via any of their logged in services. Those that can watch the game, experience no stream interruptions. Those that don't have access to the game are presented a message that they have 5 minutes to log into the relevant service or being unable to access the stream
    All new viewers are presented with a message to complete the TV and streaming service authentication process. They are also presented with a list of potential TV and streaming services, based on their location and the game event
      For the Mets vs. Pirates example, a new viewer from inside New York would be presented with a list of cable providers that provide access to SNY
Step 3: viewers complete the TV and streaming service authentication process:
  Once a viewer chooses to start the authentication process, they are presented with a list of platforms they can use to watch on the coordinator 118
  Once a viewer clicks on a service, they are presented with a screen to input their credentials
  After a viewer submits their credentials, the coordinator 118 inputs those same credentials in a temporary remote browser.
  This part is invisible to the viewer—the viewer will display a short loading screen to confirm the process is ongoing.
    Assuming the credentials are correct, the coordinator 118 is able to login to the platform and quickly parse what subscriptions the viewer has access to and what channels are available to them based on their subscription
    If we confirm the viewer has access to the specific network or streaming service that is showing the game, the viewer displays an access verified message and the viewer can continue to display the game without interruption.

Figure 6:
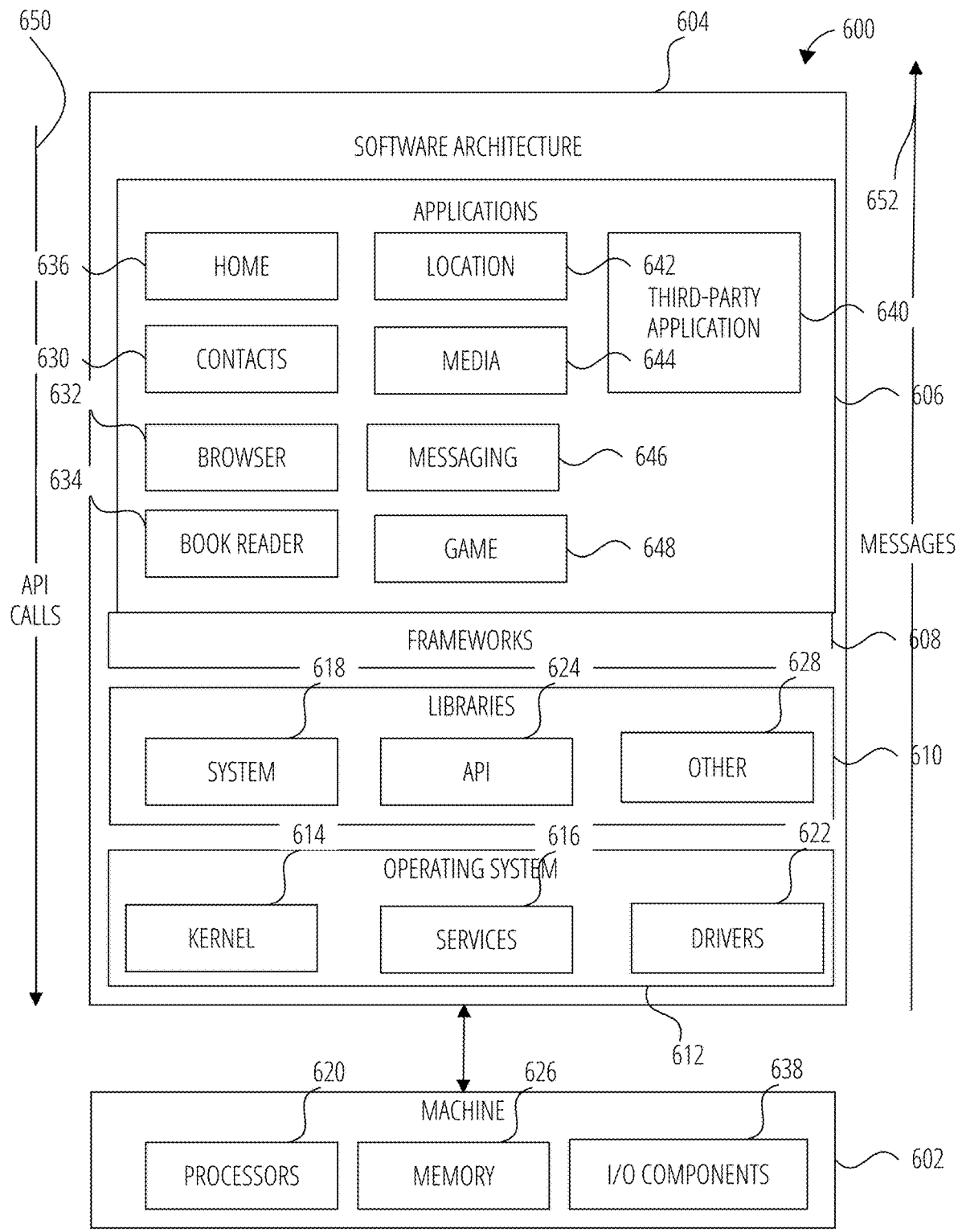
FIG. 6 is a block diagram showing a software architecture within which the present disclosure may be implemented, according to some examples.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, Processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, and power management drivers.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., Web Kit to provide web browsing functionality), and the like. The libraries 610 can also include a wide variety of other libraries 628 to provide many other APIs to the applications 606.

The frameworks 608 provide a high-level common infrastructure used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In some examples, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 650 provided by the operating system 612 to facilitate functionality described herein.

Figure 7:
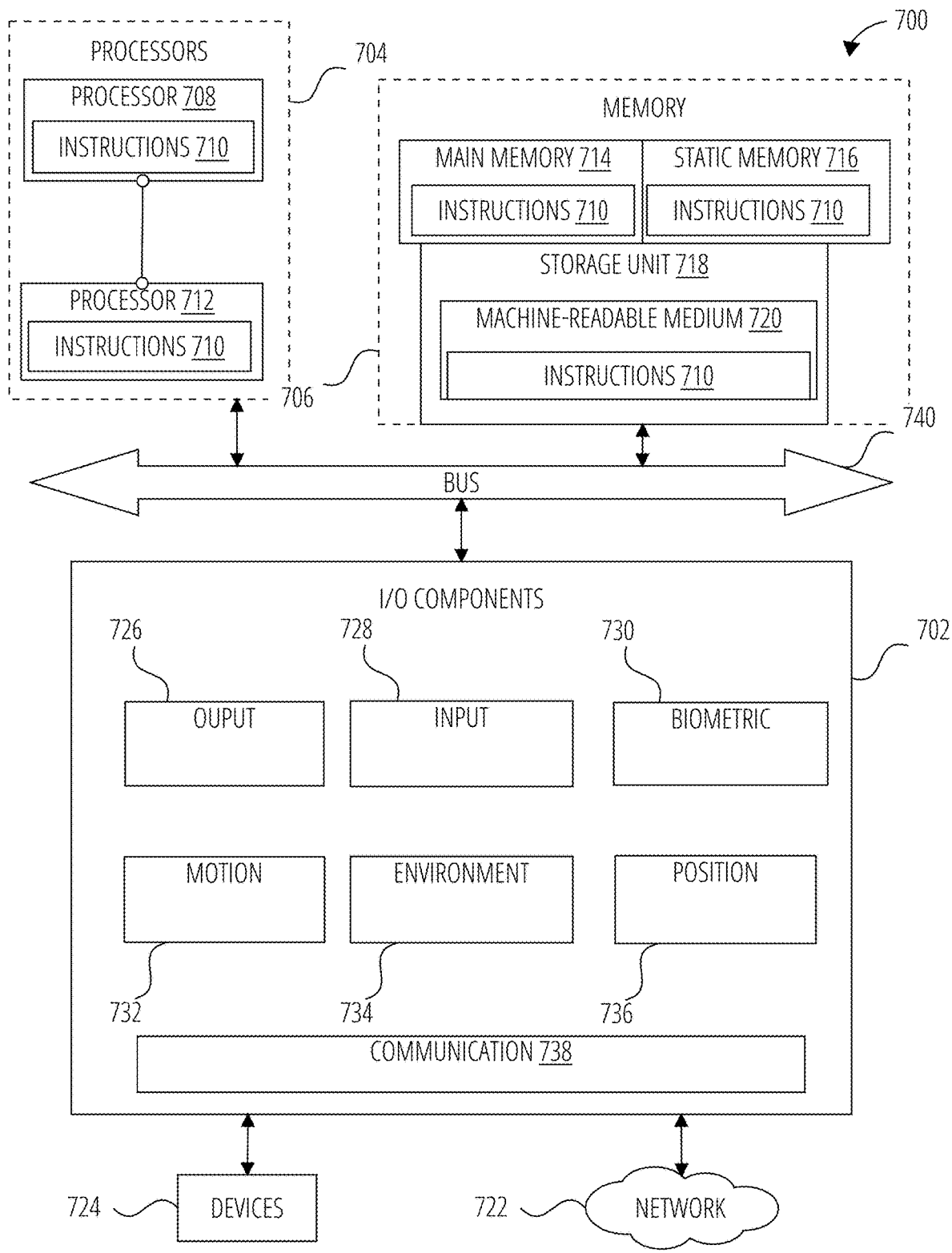
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 710 (e.g., software, a program, an application, an applet, an app, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while a single machine 700 is illustrated, the term "machine" may include a collection of machines that individually or jointly execute the instructions 710 to perform any one or more of the methodologies discussed herein.

The machine 700 may include processors 704, memory 706, and I/O components 702, which may be configured to communicate via a bus 740. In some examples, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another Processor, or any suitable combination thereof) may include, for example, a Processor 708 and a Processor 712 that execute the instructions 710. The term "Processor" is intended to include multi-core processors that may comprise two or more independent processors (sometimes referred to as "cores") that may execute instructions contemporaneously. Although FIG. 7 shows multiple processors 704, the machine 700 may include a single processor with a single core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, wholly or partially, within the main memory 714, within the static memory 716, within machine-readable medium 720 within the storage unit 718, within the processors 704 (e.g., within the processor's cache memory), or any suitable combination thereof, during execution thereof by the machine 700.

The I/O components 702 may include various components to receive input, provide output, produce output, transmit information, exchange information, or capture measurements. The specific I/O components 702 included in a particular machine depend on the type of machine. For example, portable machines such as mobile phones may include a touch input device or other such input mechanisms, while a headless server machine will likely not include such a touch input device. The I/O components 702 may include many other components not shown in FIG. 7. In various examples, the I/O components 702 may include output components 726 and input components 728. The output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), or other signal generators. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), or identify a person (e.g., voice identification, retinal identification, facial identification, fingerprint identification, or electroencephalogram-based identification). The motion components 732 include acceleration sensor components (e.g., accelerometer), gravitation sensor components, rotation sensor components (e.g., gyroscope). The environmental components 734 include, for example, one or more cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 736 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface Component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data glyph, Maxi Code, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, or location via detecting an NFC beacon signal that may indicate a particular location.

The various memories (e.g., main memory 714, static memory 716, and/or memory of the processors 704) and/or storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

EXAMPLES

1. A method, comprising:
   for a plurality of devices, each of the plurality of devices having access to a first video stream from at least one of a plurality of streamers of the first video stream, confirming authorization to access the first video stream from one of the plurality of streamers of the first video stream; selecting a first streamer from the plurality of the streamers;
   receiving the first video stream from the first streamer;
   transmitting the first video stream to the plurality of devices having confirmed authorization.
2. The method of example 1, wherein the confirming authorization includes for the plurality of devices checking credentials of each device of the plurality of devices and a location of each device of the plurality of devices.
3. The method of any of the preceding examples, wherein the location of each device is determined based on IP address, location as determined by global positioning system measurements, and/or mobile phone carrier.
4. The method of any of the preceding examples, further comprising causing transmission of a second video stream from a host device to the plurality of devices having confirmed authorization.
5. The method of any of the preceding examples, further comprising causing display of the first and second video streams on the plurality of devices having confirmed authorization, wherein the second video stream overlays the first video stream.
6. The method of any of the preceding examples, further causing transmission of a third video stream from the one of the plurality of devices to the host device and the plurality of devices.
7. The method of any of the preceding examples, wherein the selecting the first streamer is based on historical reliability.
8. The method of any of the preceding examples, wherein the at least one of a plurality of streamers of the first video stream is different from the one of the plurality of streamers of the first video stream.
9. The method of any of the preceding examples, wherein the first video stream is of a live event.
10. A non-transitory computer-readable storage medium, the computer-readable storage medium including instructions that when executed by a computer, cause the computer to:
for a plurality of devices, each of the plurality of devices having access to a first video stream from at least one of a plurality of streamers of the first video stream, confirm authorization to access the first video stream from one of the plurality of streamers of the first video stream;
select a first streamer from the plurality of the streamers;
receive the first video stream from the first streamer;
transmit the first video stream to the plurality of devices having confirmed authorization.
11. A computing apparatus comprising:
a processor; and
a non-transitory memory storing instructions that, when executed by the processor, configure the apparatus to:
for a plurality of devices, each of the plurality of devices having access to a first video stream from at least one of a plurality of streamers of the first video stream, confirm authorization to access the first video stream from one of the plurality of streamers of the first video stream;
select a first streamer from the plurality of the streamers;
receive the first video stream from the first streamer;
transmit the first video stream to the plurality of devices having confirmed authorization.
12. The computing apparatus of any of the preceding examples, wherein the confirming authorization includes for the plurality of devices check credentials of each device of the plurality of devices and a location of each device of the plurality of devices.
13. The computing apparatus of any of the preceding examples, wherein the location of each device is determined based on IP address, location as determined by global position system measurements, and/or mobile phone carrier.
14. The computing apparatus of any of the preceding examples, wherein the instructions further configure the apparatus to cause transmission of a second video stream from a host device to the plurality of devices having confirmed authorization.
15. The computing apparatus of any of the preceding examples, wherein the instructions further configure the apparatus to cause display of the first and second video streams on the plurality of devices having confirmed authorization, wherein the second video stream overlays the first video stream.
16. The computing apparatus of any of the preceding examples, wherein the instructions further configure the apparatus to cause transmission of a third video stream from the one of the plurality of devices to the host device and the plurality of devices.
17. The computing apparatus of any of the preceding examples, wherein the selecting the first streamer is based on historical reliability.
18. The computing apparatus of any of the preceding examples, wherein the at least one of a plurality of streamers of the first video stream is different from the one of the plurality of streamers of the first video stream.
19. The computing apparatus of any of the preceding examples, wherein the first video stream is of a live event.
20. The computing apparatus of any of the preceding examples, wherein the receiving comprises using a remote browser to access the selected first streamer.

Glossary

"Carrier Signal" refers to any intangible medium capable of storing, encoding, or carrying instructions for execution by the machine, and includes digital or analog communications signals or other intangible media to facilitate communication of such instructions. Instructions may be transmitted or received over a network using a transmission medium via a network interface device.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner In examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. A decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of methods described herein may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In some examples, the processors or processor-implemented components may be distributed across a number of geographic locations.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine-Storage Medium" refers to a single or multiple storage devices and/or media (e.g., a centralized or distributed database, and/or associated caches and servers) that store executable instructions, routines and/or data. The term includes solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium", "device-storage medium," "computer-storage medium"

mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Module" refers to logic having boundaries defined by function or subroutine calls, branch points, Application Program Interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods and routines described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal Medium" refers to any intangible medium that is capable of storing, encoding, or carrying the instructions for execution by a machine and includes digital or analog communications signals or other intangible media to facilitate communication of software or data. The term "signal medium" may include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
    confirming for at least one user of each device of a plurality of devices, which are configured to receive a first video stream from at least one source of the first video stream, that the at least one user of the each device of the plurality of devices has a subscription to the at least one source of the first video stream using authorization information received from the at least one user of each device of the plurality of devices;
    after the confirming, receiving only the first video stream from the at least one source;
    transmitting the first video stream to the each device of the plurality of devices for which it is confirmed that the at least one user has the subscription; and
    transmitting a second stream to the each device of the plurality of devices for which it is confirmed that the at least one user has the subscription for synchronous display with the first video stream;
    wherein the second stream is different from the first video stream and originates from a device other than the at least one source of the first video stream;
    wherein the at least one source includes a plurality of sources and the method further comprises selecting one source from the plurality of sources for transmission of the first video stream to the each device of the plurality of devices for which it is confirmed that the at least one user has the subscription;
    wherein the selected at least one source is different from a subscribed streamer for at least one user.

2. The method of claim 1, wherein the confirming the subscription includes for the plurality of devices checking that a location of each device of the plurality of devices matches subscription terms.

3. The method of claim 2, wherein the location of each device is determined based on IP address, location as determined by global positioning system measurements, and/or mobile phone carrier.

4. The method of claim 1, wherein the second stream includes a video stream and the method further comprises causing display of the first and second video streams on the plurality of devices of users having confirmed subscriptions, wherein the second video stream overlays the first video stream.

5. The method of claim 4, further causing transmission of a third video stream from one of the plurality of devices to other devices of the plurality of devices.

6. The method of claim 1, wherein the selecting the at least one source is based on historical reliability.

7. The method of claim 1, wherein the first video stream is of a live sporting event.

8. The method of claim 1, further comprising using an application, that is running on the each device of the plurality of devices for which it is confirmed that the at least one user has the subscription, to combine at least a portion of the first video stream with at least a portion of the second stream.

9. A non-transitory computer-readable storage medium, the computer-readable storage medium including instructions that when executed by a computer, cause the computer to:
    confirm for at least one user of each device of a plurality of devices, which are configured to receive a first video stream from at least one source of the first video stream, that at least one user of the each device of the plurality of devices has a subscription to the at least one source of the first video stream using authorization information received from the at least one user of each device of the plurality of devices;
    after the confirming, receive only the first video stream from the at least one source;
    transmit the first video stream to the each device of the plurality of devices for which it is confirmed that the at least one user has the subscription; and
    transmit a second stream to the each device of the plurality of devices for which it is confirmed that the at least one user has the subscription for synchronous display with the first video stream, wherein the second stream is different from the first video stream and originates from a device other than the at least one source of the first video stream;
    wherein the at least one source includes a plurality of sources and the instructions further cause the computer to select one source from the plurality of sources for transmission of the first video stream to the each device of the plurality of devices for which it is confirmed that the at least one user has the subscription;
    wherein the selected at least one source is different from a subscribed streamer for at least one user.

10. A computing apparatus comprising:
    a processor, and
    a non-transitory memory storing instructions that, when executed by the processor, configure the apparatus to:
    confirm for at least one user of each device of a plurality of devices, which are configured to receive a first video stream from at least one source of the first video stream, that at least one user of the each device of the plurality of devices has a subscription to the at least one source of the first video stream using authorization information received from the at least one user of each device of the plurality of devices;
    after the confirming, receive only the first video stream from the at least one source;
    transmit the first video stream the each device of the plurality of devices for which it is confirmed that the at least one user has the subscription; and
    transmit a second stream to the each device of the plurality of devices for which it is confirmed that the at least one user has the subscription for synchronous display with the first video stream, wherein the second stream is different from the first video stream and originates from a device other than the at least one source of the first video stream;
    wherein the at least one source includes a plurality of sources and the instructions further configure the apparatus to select one source from the plurality of sources for transmission of the first video stream to the each device of the plurality of devices for which it is confirmed that the at least one user has the subscription; wherein the selected at least one source is different from a subscribed streamer for at least one user.

11. The computing apparatus of claim 10, wherein the confirming the subscription includes for the plurality of devices check that a location of each device of the plurality of devices matches subscription terms.

12. The computing apparatus of claim 11, wherein the location of each device is determined based on IP address, location as determined by global position system measurements, and/or mobile phone carrier.

13. The computing apparatus of claim 10, wherein the second stream includes a video stream and wherein the instructions further configure the apparatus to cause display of the first and second video streams on the plurality of devices users having confirmed subscriptions, wherein the second video stream overlays the first video stream.

14. The computing apparatus of claim 13, wherein the instructions further configure the apparatus to cause transmission of a third video stream from one of the plurality of devices to other devices of the plurality of devices.

15. The computing apparatus of claim 10, wherein the selecting the at least one source is based on historical reliability.

16. The computing apparatus of claim 10, wherein the first video stream is of a live sporting event.

17. The computing apparatus of claim 10, wherein the receive the first video stream comprises using a remote browser to access the at least one source.

* * * * *